(12) United States Patent
Martin

(10) Patent No.: US 10,138,078 B2
(45) Date of Patent: Nov. 27, 2018

(54) DE-STACKING DEVICE FOR DE-STACKING LAYERS OF TRANSPORT PALLETS WITH OR WITHOUT INTERMEDIARY LAYERS

(71) Applicant: MartinMechanic Friedrich Martin GmbH & Co. KG, Nagold (DE)

(72) Inventor: Claus Martin, Nagold (DE)

(73) Assignee: MartinMechanic Friedrich Martin GmbH & Co. KG, Nagold (DE)

( * ) Notice: Subject to any disclaimer, the term of this patent is extended or adjusted under 35 U.S.C. 154(b) by 0 days.

(21) Appl. No.: 15/493,408

(22) Filed: Apr. 21, 2017

(65) Prior Publication Data

US 2017/0305691 A1    Oct. 26, 2017

(30) Foreign Application Priority Data

Apr. 21, 2016 (DE) .......................... 10 2016 107 384

(51) Int. Cl.
    *B65G 59/12*      (2006.01)
    *B65G 47/22*      (2006.01)
    (Continued)

(52) U.S. Cl.
    CPC ............ *B65G 59/02* (2013.01); *B65G 15/12* (2013.01); *B65G 47/91* (2013.01); *B65G 47/965* (2013.01); *B65G 59/005* (2013.01); *B65G 61/00* (2013.01)

(58) Field of Classification Search
    CPC ...... B65G 59/005; B65G 47/91; B65G 59/04; B65G 47/945; B65G 57/005; B65G 59/02; B65G 61/00; B65G 47/965; B65G 15/12; B65G 15/00; B65G 2201/0267; B65G 2207/46; B65H 2402/31; Y10S 414/106

USPC ... 198/370.03, 370.04, 370.06, 418.6, 461.5; 270/58.05; 271/192; 414/790.5, 794, 414/794.2

See application file for complete search history.

(56) References Cited

U.S. PATENT DOCUMENTS 3,624,850 A * 12/1971 Thompson ............. B65G 69/00
                                                                              101/420
4,984,677 A * 1/1991 Prakken .................. B65B 5/101
                                                                              198/418.6

(Continued)

FOREIGN PATENT DOCUMENTS

DE           4142162 A1    6/1993
DE           4220026 A1    9/1993
(Continued)

*Primary Examiner* — Gregory W Adams
(74) *Attorney, Agent, or Firm* — Von Rohrscheldt Patents

(57) ABSTRACT

A de-stacking device for layer de-stacking stacking layers from standard transport pallets which include a multi-layer stack of stacking layers arranged on top of each other, wherein an optional bending stiff spacer is arranged under each of the stacking layers, wherein the stacking layers are formed by a plurality of stable standing transport goods that are stackable and arranged adjacent to each other, the de-stacking device including a placement and separation table for a respective stacking layer that is removed from the stack of the transport pallet and includes or does not include the optional spacer; a transfer device for transferring the respective stacking layer that includes or does not include the optional spacer from the stack of the transport pallet onto the placement and separation table, wherein the placement and separation table includes a fixation device for the optional spacer.

1 Claim, 3 Drawing Sheets

(51) Int. Cl.
*B65G 59/02* (2006.01)
*B65G 15/12* (2006.01)
*B65G 47/91* (2006.01)
*B65G 47/96* (2006.01)
*B65G 59/00* (2006.01)
*B65G 61/00* (2006.01)

(56) References Cited

U.S. PATENT DOCUMENTS

| | | | | |
|---|---|---|---|---|
| 5,135,351 A | * | 8/1992 | Rathert | B42C 19/08 |
| | | | | 414/416.03 |
| 6,701,841 B2 | * | 3/2004 | Tsurumaki | B65H 29/70 |
| | | | | 101/416.1 |

FOREIGN PATENT DOCUMENTS

| | | | |
|---|---|---|---|
| DE | 19515998 C2 | 11/1996 | |
| DE | 102007056826 A1 | 6/2009 | |
| DE | 202010008173 U1 | 11/2011 | |
| EP | 0431346 A2 | 6/1991 | |
| EP | 0610780 A1 | 8/1994 | |
| EP | 2062838 A1 * | 5/2009 | ........... B65G 59/005 |
| EP | 2530037 A1 * | 12/2012 | ........... B65G 59/005 |
| WO | WO-2011135031 A1 * | 11/2011 | ............. B65G 47/91 |

\* cited by examiner

DE-STACKING DEVICE FOR DE-STACKING LAYERS OF TRANSPORT PALLETS WITH OR WITHOUT INTERMEDIARY LAYERS

RELATED APPLICATIONS

This application claims priority from and incorporates by reference German patent application DE10 2016 107 384.9 filed on Apr. 21, 2016.

FIELD OF THE INVENTION

The invention relates to a de-stacking device for de-stacking layers from stacked standard transport pallets.

BACKGROUND OF THE INVENTION

These stacking devices of this generic type are known in the art in many embodiments. Reference is made to the printed documents DE 42 200 026 A1, DE 41 42 162 A1, EP 0 431 346 A2, DE 195 15 998 C2 and EP 0 610 780 A1. These documents respectively disclose de-stacking devices which are configured to remove stacking layers with a bending stiff separation layer arranged between the stacking layers from the stack of the transport pallets together with the separation layer and to transfer them onto a placement/separation table where the separation layer that is arranged below the stacking layer is removed from the transport goods and the transport goods are then provided to an extraction conveyor.

It is a perceived disadvantage of these stacking devices that they are not universally useable. In particular the stacking devices can only be used for de-stacking transport pallets where a separation layer or a spacer is provided between the stacking layers. Thus, de-stacking transport pallets without a separation layer between the stacking layers is not possible.

BRIEF SUMMARY OF THE INVENTION

Improving upon the prior art it is an object of the invention to propose a de-stacking device for de-stacking layers of stacked transport pallets wherein the de-stacking device is universally usable and configured to de-stack stacking layers with and without an intermediary layer and configured to transfer the transport goods of the stacking layers from the placement and separation table to an extraction conveyor. Furthermore removing the spacers shall be achievable with low mechanical complexity.

This object is achieved according to the invention by a de-stacking device for layer de-stacking stacking layers from standard transport pallets which include a multi-layer stack of stacking layers arranged on top of each other, wherein an optional bending stiff spacer is arranged under each of the stacking layers, wherein the stacking layers are formed by a plurality of stable standing transport goods that are stackable and arranged adjacent to each other, the de-stacking device including a placement and separation table for a respective stacking layer that is removed from the stack of the transport pallet and includes or does not include the optional spacer; a transfer device for transferring the respective stacking layer that includes or does not include the optional spacer from the stack of the transport pallet onto the placement and separation table, wherein the placement and separation table includes a fixation device for the optional spacer, a displacement device for displacing the transport goods arranged on the optional spacer from the placement and separation table to a transport band extracting the transport goods, an extraction device for extracting the optional spacer from the placement and separation table, and a band conveying device for conveying transport goods that are not supported by the optional spacer from the placement and separation table to the extraction conveyor. Additional advantageous embodiments of the invention can be derived from the dependent patent claims.

The de-stacking device according to the invention for layer de-stacking of stacked advantageously standard transport pallets which include a multi-layer stack of stacking layers arranged on top of each other is provided to process stacking layers with and without separation layers, wherein the stacking layers are formed by a number of stable standing transport goods that are stackable and arranged adjacent to each other. Thus, the spacer is optional so that the proposed de-stacking device is universally useable. The de-stacking device includes a placement and separation table for a stacking layer respectively removed from the stack of transport pallet with or without the spacer and a transfer device for the respective stacking layer with or without the spacer of the stack of transport pallets onto the placement and separation table. The placement and separation table includes a fixation device for the optional intermediary layers at the placement and separation table, a displacement device for displacing the transport goods arranged on the optional spacer from the placement and separation table to a transport band extracting the transport goods and an extraction device for the spacer of the stacking layers from the placement and separation table and a band conveying device for conveying transport goods that are not supported by a spacer from the placement and separation table to the extraction conveyor.

Irrespective whether a multi-layer stack shall be de-stacked with or without separation layers between the respective stacking layers a respective stacking layer with or without the optionally provided spacer is removed by the transfer device from a top of a stack resting on the transport pallet and placed onto the placement and separation table. The transfer device can be configured in any way. The transfer device however advantageously has to include support and gripping devices for supporting or gripping the stacking layer with or without the spacer. Irrespective whether a stacking layer is on the placement and separation table with or without the intermediary layer different devices of the placement and separation table are used for forwarding the transport goods to the extraction conveyor.

For stacking layers without the spacer only the conveyor feeding device of the placement and separation table is used. The motor driven band feeding device which includes at least one conveyor belt supports the stable standing stackable transport goods that are arranged adjacent to each other and moves the transport goods directly to the extraction conveyor. Thus, the provided displacement device can optionally support the band feeding device when moving the transport goods, this means the displacement device can move together with the band feeding device. The other devices of the placement and separation table thus remain inactive.

The conveyor feeding device is not used for stacking layers with the spacer. Instead the fixation device provided at the placement and separation table is used for the spacer and the displacement device that is also provided is used for the transport goods. Using the fixation device the spacer of the stacking layer is temporarily fixated at the placement and separation table and then the transport goods arranged on the spacer are moved by the displacement device onto the extraction conveyor. Thus, the fixation device for the spacer can for example clamp or vacuum fixate the spacer. Thereafter the extraction device of the placement and separation table for the optional spacer is activated in order to remove the spacer from the placement and separation table. The extraction device can for example clamp or vacuum fixate the optional spacer like the fixation device. The displacement device provided at the placement and separation table can also be configured in any manner. The displacement device can engage the transport goods of the stacking layer on one side and can reach entirely or partially around the transport goods and can support or grip the transport goods.

It is appreciated that the de-stacking device according to the invention includes a device control by which the transfer device for the stacking layer, the fixation device for the spacer, the displacement device for the transport goods, the extraction device for the optional spacer and the band conveying device for the transport goods are controllable independently from each other or in combination with each other.

Advantageously the fixation device of the placement and separation table is configured as a vacuum fixation device for the optionally provided bending stiff spacer and includes a plurality of suction cavities by which the spacer of the respective stacking layer is vacuum fixateable at the placement and separation table. Thus, the suction cavities are connected through vacuum channels integrated in the placement and separation table with a vacuum pump generating a vacuum. The provided suction cavities are activatable or deactivatable any time by valves connected there between.

In an advantageous embodiment of the invention the band conveying device includes a plurality of conveyor belts that are arranged adjacent to each other and offset from each other. The conveyor belts are separated from each other by intermediary bars configured at the placement and separation table. The conveyor belts can be uncoated or coated textile belts, rubber belts or metal belts with any cross sectional shape.

In an advantageous embodiment of the de-stacking device according to the invention the extraction device for the optional spacer is formed by a pivotably arranged table top of the placement and separation table wherein the table top supports the stacking layer transferred from the stack with or without the spacer in a horizontal operating position, wherein the table top is pivotable from a horizontal operating position into a vertical non-operating position in order to drop the empty spacer. In order to drop the spacer the fixation device for the spacer has to be deactivated. The table top is thus configured with at least the same size as the bending stiff intermediary layer. The table top is advantageously laterally linked at a frame of the placement and separation table.

In one embodiment of the invention the fixation device and the band conveying device are integrated into the table top, wherein the conveying belts of the band conveying device advantageously protrude slightly beyond the table top and the suction cavities of the vacuum fixation device are arranged recessed between the conveying belts and/or an edge of the table top. Advantageously the pivotable table top is configured divided and includes two pivotable table top leaves. The table top leaves are pivotably attached at an outside of the frame of the placement and separation table. When pivoting the table top or the two table top leaves from the horizontal operating position into the vertical non-operating position for ejecting the empty spacer a pass through gap is formed between the edge of the table top or between the two table top leaves wherein the spacer drops downward through the pass through gap when the fixation device for the intermediary layer is activated and thus becomes ineffective.

In one embodiment of the invention the displacement device is configured with a displacement bar that is supported in a linear manner. The displacement bar can be brought in contact with the side of the transport goods that is oriented away from the extraction conveyor so that the displacement bar pushes the transport goods on the extraction conveyor.

As stated supra the transfer device can be configured in many ways. The transfer device can be for example a multiple system with plural linear supports wherein the transfer device moves the stacking layer with or without the spacer in three dimensions. Advantageously the transfer device with the de-stacking device according to the invention includes a linked arm robot with a gripper system which moves the stacking layer with or without the spacer in three dimensions. In order to receive transport goods that are stacked on pallets robots with a receiving device for the transport goods arranged at the robot arm are known which include a gripping tool. Tools of this type are typically configured so that receiving the transport goods for example of a stacking layer of a multi-layer stack with or without a spacer is performed in a vertical direction after the receiving device is brought in position above the transport pallet and has been placed over the stacking layer. This way successive de-stacking of stacked pallets can be performed by removing a respective stacking layer.

BRIEF DESCRIPTION OF THE DRAWINGS

The invention is subsequently described in more detail with reference to an embodiment illustrated in a drawing figure. Further details of the invention can be derived from the subsequent description of the embodiment in combination with the patent claims and the appended drawing figure, wherein:

DETAILED DESCRIPTION OF THE INVENTION

Figure 1:
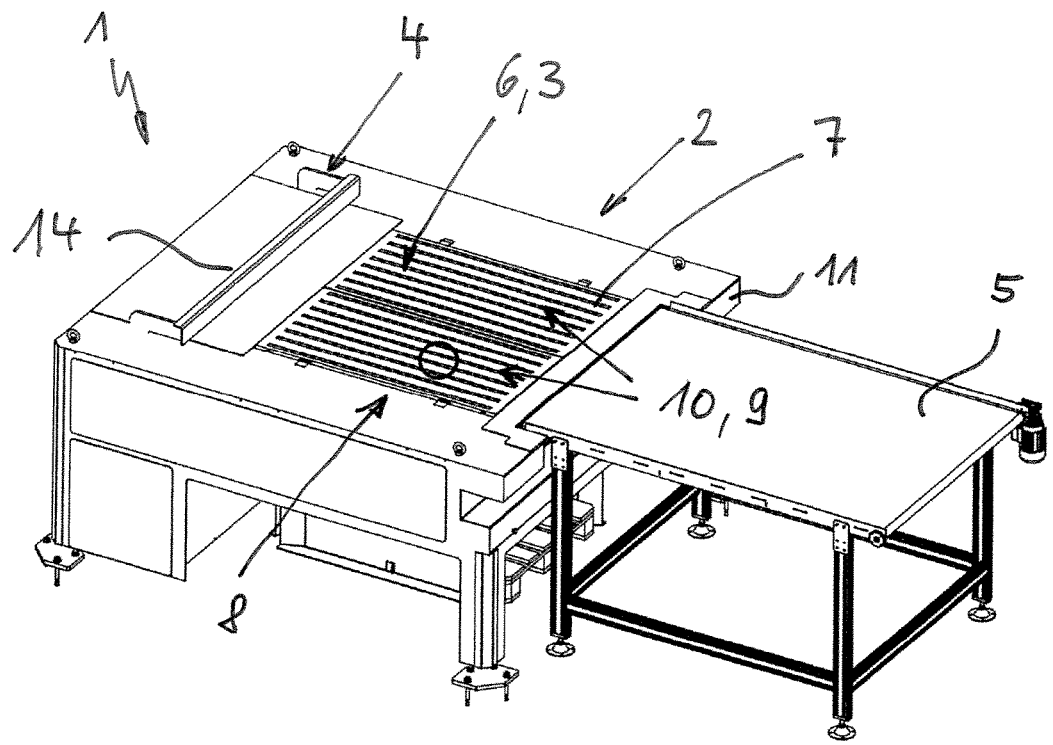
FIG. 1 illustrates a de-stacking device according to the invention with a closed table top of the placement and separation table for layered de-stacking of stacked transport pallets in a perspective view.
Figure 2:
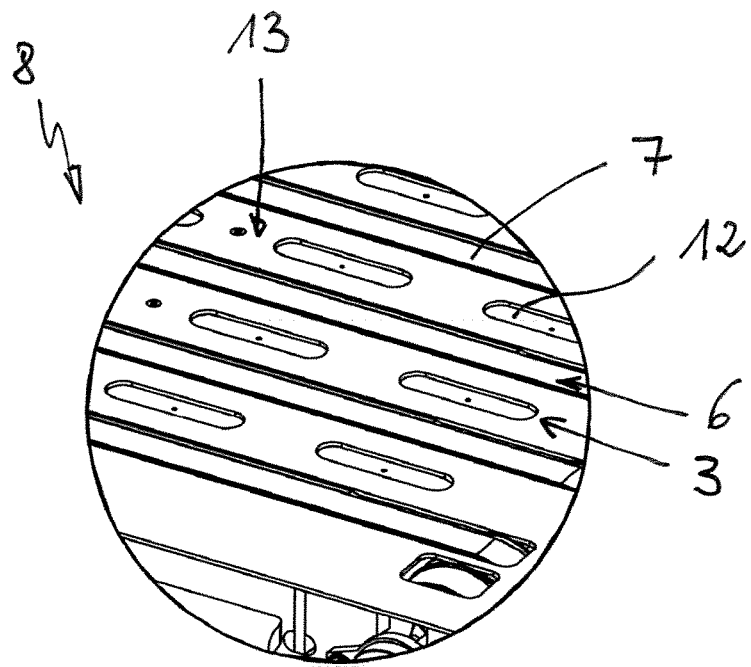
FIG. 2 illustrates a blown up detail of the table top of FIG. 1.
Figure 3:
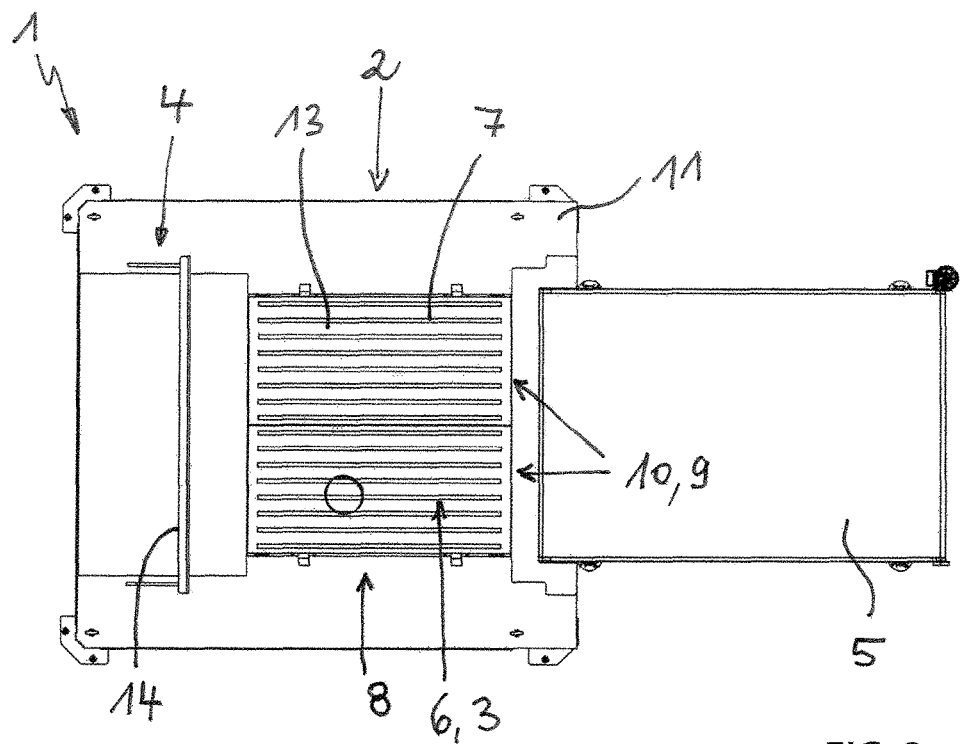
FIG. 3 illustrates the de-stacking device of FIG. 1 in top view.

FIG. 1 illustrates a de-stacking device 1 for layered de-stacking of transport pallets not illustrated in FIGS. 1-3, wherein the transport pallets include a multi-layer stack of stacking layers that are arranged on top of one another under which a respective bending stiff spacer is optionally arranged. The non-illustrated stacking layers are formed by stable standing stackable transport goods that are arranged adjacent to each other. The de-stacking device 1 includes a placement and separation table 2 for a respective stacking layer removed from a top of a stack of the transport pallets with or without the spacer which stacking layer is transferred onto the placement and separation table by a transfer device that is not illustrated in FIGS. 1-3 for the stacking layer with or without the spacer of the stack of the transport pallet. The transfer device includes a pivot arm robot with a gripper system which moves the stacking layer with or without the spacer in three dimensions. The displacement device respectively places a stacking layer with or without the spacer on the placement and separation table 2. The placement and separation table 2 includes a fixation device 3 for the optional spacer at the placement and separation table 2.

Furthermore the placement and separation table includes a displacement device 4 for the transport goods that are arranged on the optional spacer and not illustrated in FIGS. 1-3 from the placement and separation table 2 to a conveyor belt 5 extracting the transport goods and a band conveyor device 6 for conveying transport goods that are not supported on an intermediary layer from the placement and separation table 2 to the extraction conveyor 5. The fixation device 3 which is advantageously configured as a vacuum fixation device and the band conveyor device 6 which is advantageously formed by a plurality of conveyor belts 7 that are arranged adjacent to each other with a distance there between are integrated into a pivotably supported table top 8 of the placement and separation table 2 which simultaneously forms the extraction device 9 for the optional spacer. The pivotable table top 8 is configured divided in the illustrated embodiment and includes two pivotable table top leaves 10 which are laterally linked at a frame 11 of the placement and separation table 2. The two table top leaves 10 which support the stacking layer with or without the spacer, which stacking layer is transferred from the stack in a horizontal closed operating position of the table top 8 are pivotable from a closed operating position into a vertical non-operating position to eject the empty spacer.

FIG. 2 illustrates an enlarged detail of the table top 8 of FIG. 1. This clearly shows that the fixation device 3 is configured as vacuum fixation device 3. The vacuum fixation device 3 thus includes a number of suction cavities 12 for providing a temporary fixation of the spacer of the stacking layer not illustrated in the drawing figure. The suction cavities 12 are not illustrated in FIG. 1 for reasons of clarity. The suction cavities 12 are shaped as slotted holes and are connected through vacuum channels integrated in the placement and separation table 2 that are not visible with a vacuum pump that is not visible either, wherein the provided vacuum cavities 12 are activatable or deactivatable by the device control through valves that are connected there between and not illustrated.

Figure 4:
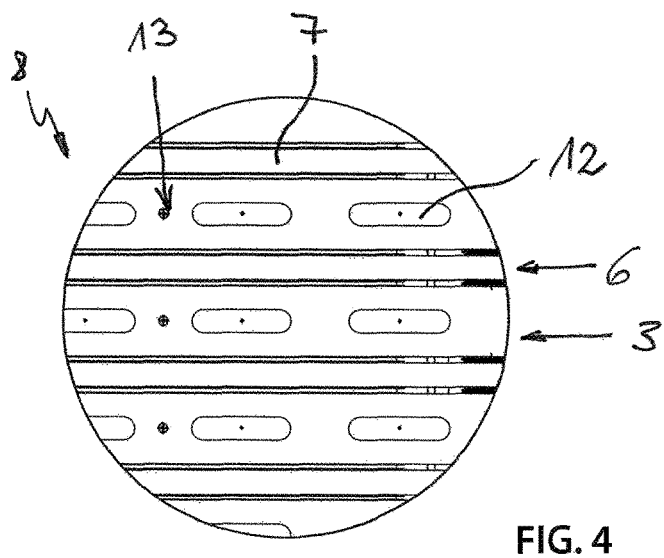
FIG. 4 illustrates a detail of the table top of FIG. 3.

FIG. 3 illustrates de-stacking device 1 in top view. In this figure the vacuum cavities 12 are not illustrated for purposes of clarity like in FIG. 1. FIG. 3 and FIG. 4 which illustrates an enlarged detail of the table top 8 of FIG. 3 emphasize that the conveyor belts 7 and the suction cavities 12 are evenly distributed over the two table top leaves 10. The conveyor belts 7 protrude slightly beyond the table top 8 or the table top leaves 10, wherein the suction cavities 12 are recessed relative to the conveyor belts 7 in order to vacuum fixate the spacer at the table top 8. The conveyor belts 7 and the vacuum cavities 12 are recessed into the table top leaves 10. The suction cavities 12 are arranged at an edge of the table top 8 and in intermediary bars 13 of the table top leaves 10 wherein the intermediary bars are arranged between the conveyor belts 7. It is visible also here like in FIG. 1 that the conveying device 4 includes a displacement bar 14 that is supported in a linear manner wherein the displacement bar is illustrated in a starting position on a side of the placement and separation table 2 that is oriented away from the extraction conveyor 5. The displacement bar is movable at a distance from the table top 8 or the table top leaves 10 to the extraction conveyor 5 and back into the starting position. The displacement bar 14 is supported in a linear manner.

Figure 5:
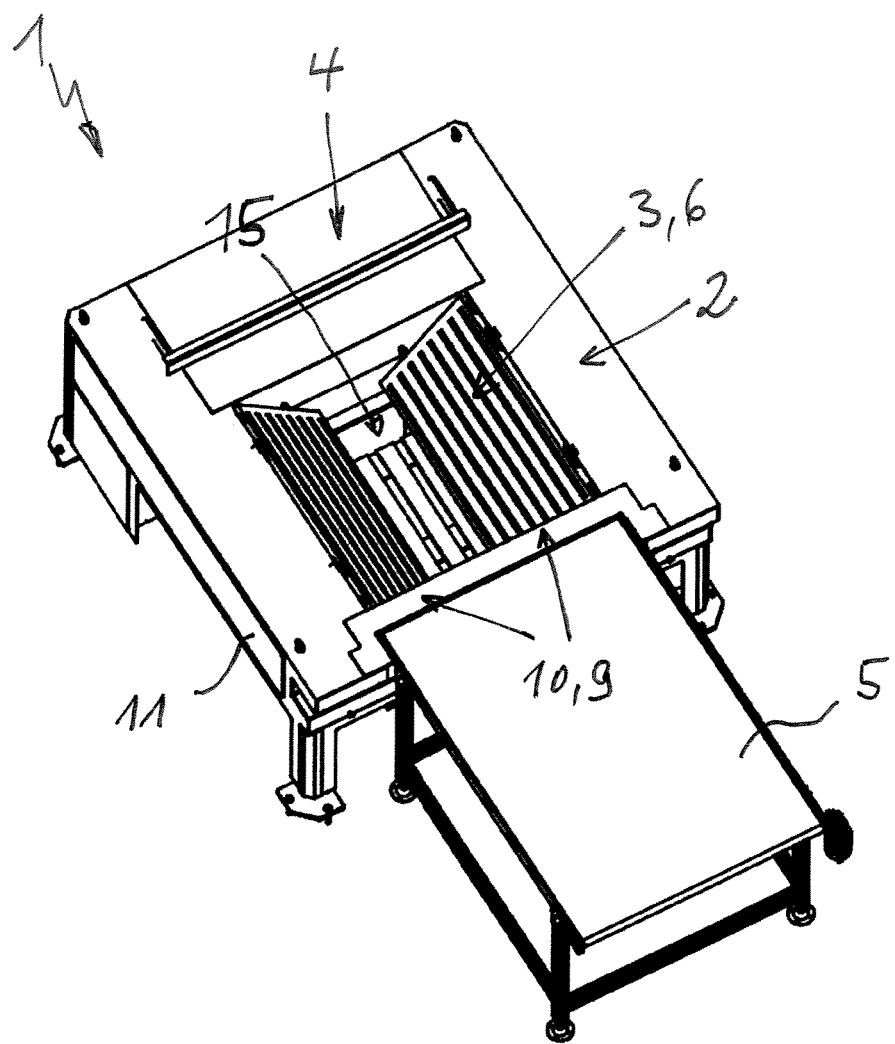
FIG. 5 illustrates the de-stacking device of FIG. 1 with open table top leaves in a perspective view.

FIG. 5 illustrates the de-stacking device 1 in a perspective view, wherein the table top leaves 10 of the table top 8 of the placement and separation table 2 are partially open, this means pivoted in a direction of a vertical non-operating position. Thus, a longitudinal pass through gap 15 is formed between the table top leaves 10 wherein the longitudinal pass through gap expands continuously and the empty intermediary layer can drop downward through the longitudinal pass through gap.

What is claimed is:

1. A de-stacking device for layer de-stacking of stacking layers from standard transport pallets which include a multi-layer stack of stacking layers arranged on top of each other,
   wherein at least one spacer that is stiff against bending is arranged under at least one of the stacking layers,
   wherein the stacking layers are formed by a plurality of stable standing transport goods that are stackable and arranged adjacent to each other,
   the de-stacking device comprising:
   a placement and separation table for a respective stacking layer that is removed from the stack of the transport pallet and includes the at least one spacer,
   wherein the placement and separation table includes a fixation device for the at least one spacer,
   a displacement device for displacing the transport goods arranged on the at least one spacer from the placement and separation table to a transport band extracting the transport goods,
   an extraction device for extracting the at least one spacer from the placement and separation table, and
   a band conveying device for conveying transport goods that are not supported by the at least one spacer from the placement and separation table to the extraction conveyor,
   wherein the extraction device is formed by a pivotably supported table top of the placement and separation table,
   wherein the pivotably supported table top supports the stacking layer that is transferred from the stack with the at least one spacer in a horizontal operating position,
   wherein the pivotably supported table top is pivotable from the horizontal operating position into a vertical non-operating position to eject the at least one spacer in an empty condition,
   wherein the fixation device and the band conveying device are integrated into the pivotably supported table top,
   wherein the conveyor belt of the band conveying device protrudes beyond the table top and suction cavities of the vacuum fixation device are recessed between the conveyor belts or at an edge of the table top.

\* \* \* \* \*